United States Patent
Tonegawa

(10) Patent No.: US 8,724,144 B2
(45) Date of Patent: May 13, 2014

(54) FACSIMILE MACHINE, CONTROL METHOD THEREFOR, AND CONTROL PROGRAM THEREFOR

(75) Inventor: Nobuyuki Tonegawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 237 days.

(21) Appl. No.: 12/863,834

(22) PCT Filed: Jan. 27, 2010

(86) PCT No.: PCT/JP2010/051457
§ 371 (c)(1),
(2), (4) Date: Jul. 21, 2010

(87) PCT Pub. No.: WO2010/090194
PCT Pub. Date: Aug. 12, 2010

(65) Prior Publication Data
US 2011/0043867 A1   Feb. 24, 2011

(30) Foreign Application Priority Data
Feb. 5, 2009 (JP) .................................. 2009-024855

(51) Int. Cl.
*G06K 15/10* (2006.01)
*H04N 1/32* (2006.01)

(52) U.S. Cl.
USPC ............................ 358/1.15; 358/442; 358/468

(58) Field of Classification Search
USPC ................................................ 358/442, 1.15
See application file for complete search history.

(56) References Cited

U.S. PATENT DOCUMENTS

| | | | | |
|---|---|---|---|---|
| 5,410,416 A | * | 4/1995 | Amberg et al. | 358/405 |
| 5,636,209 A | * | 6/1997 | Perlman | 370/281 |
| 5,764,733 A | * | 6/1998 | Kaminsky et al. | 379/67.1 |
| 5,917,904 A | * | 6/1999 | Theis | 379/355.08 |
| 6,101,245 A | * | 8/2000 | Gilai | 379/100.14 |
| 6,111,661 A | * | 8/2000 | Kim | 358/434 |
| 6,134,590 A | * | 10/2000 | Perlman | 709/228 |
| 6,813,036 B1 | * | 11/2004 | Matsushita | 358/1.15 |

(Continued)

FOREIGN PATENT DOCUMENTS

| | | |
|---|---|---|
| EP | 2 136 544 A1 | 12/2009 |
| JP | 2001-211285 A | 8/2001 |

(Continued)

OTHER PUBLICATIONS

JP 2003-044402 English Translation.*

(Continued)

*Primary Examiner* — Madelein A Nguyen
(74) *Attorney, Agent, or Firm* — Rossi, Kimms & McDowell LLP

(57) ABSTRACT

A facsimile machine that enables to limit a facsimile transmission based on a network address converted from an inputted telephone number, and provides a facsimile transmission based on a network address designated as a destination of received image data. An input unit inputs a telephone number of a transmitting destination. A setting unit sets a transmission limit domain to which a facsimile transmission is limited. An acquisition unit adapted to acquire a network address corresponding to the telephone number inputted via the input unit. A control unit that limits a facsimile transmission of which the transmitting destination is the acquired network address based on a domain of the network address acquired by the acquisition unit and the transmission limit domain set by the setting unit.

8 Claims, 11 Drawing Sheets

(56) References Cited

U.S. PATENT DOCUMENTS

| | | | |
|---|---|---|---|
| 7,924,454 B2* | 4/2011 | Boire-Lavigne et al. | 358/1.15 |
| 2002/0091941 A1* | 7/2002 | Challener et al. | 713/201 |
| 2003/0193933 A1* | 10/2003 | Jonas et al. | 370/352 |
| 2004/0218747 A1* | 11/2004 | Ranalli et al. | 379/218.01 |
| 2005/0207402 A1* | 9/2005 | Kobayashi et al. | 370/352 |
| 2006/0262343 A1* | 11/2006 | Kikuchi et al. | 358/1.15 |
| 2007/0008952 A1* | 1/2007 | Miao | 370/352 |
| 2007/0178918 A1* | 8/2007 | Shon | 455/466 |
| 2008/0049918 A1* | 2/2008 | Heinze et al. | 379/142.1 |
| 2008/0208760 A1* | 8/2008 | Keithley | 705/75 |
| 2008/0310608 A1* | 12/2008 | Johnson et al. | 379/112.01 |
| 2010/0105446 A1* | 4/2010 | Charlier et al. | 455/569.1 |
| 2010/0183130 A1* | 7/2010 | Lin | 379/93.02 |
| 2011/0043867 A1* | 2/2011 | Tonegawa | 358/442 |
| 2012/0195262 A1* | 8/2012 | Furukawa et al. | 370/328 |
| 2012/0302255 A1* | 11/2012 | Wang et al. | 455/456.1 |
| 2013/0191402 A1* | 7/2013 | Wilkins et al. | 707/752 |

FOREIGN PATENT DOCUMENTS

| | | | | |
|---|---|---|---|---|
| JP | 2002-111936 A | | 4/2002 | |
| JP | 2003-044402 A | | 2/2003 | |
| JP | 2003044402 A | * | 2/2003 | G06F 13/00 |
| JP | 2005-094662 A | | 4/2005 | |
| JP | 2008-227633 A | | 9/2008 | |

OTHER PUBLICATIONS

International Search Report including Written Opinion issued in related PCT/JP2010/051457 mailed May 18, 2010.

* cited by examiner

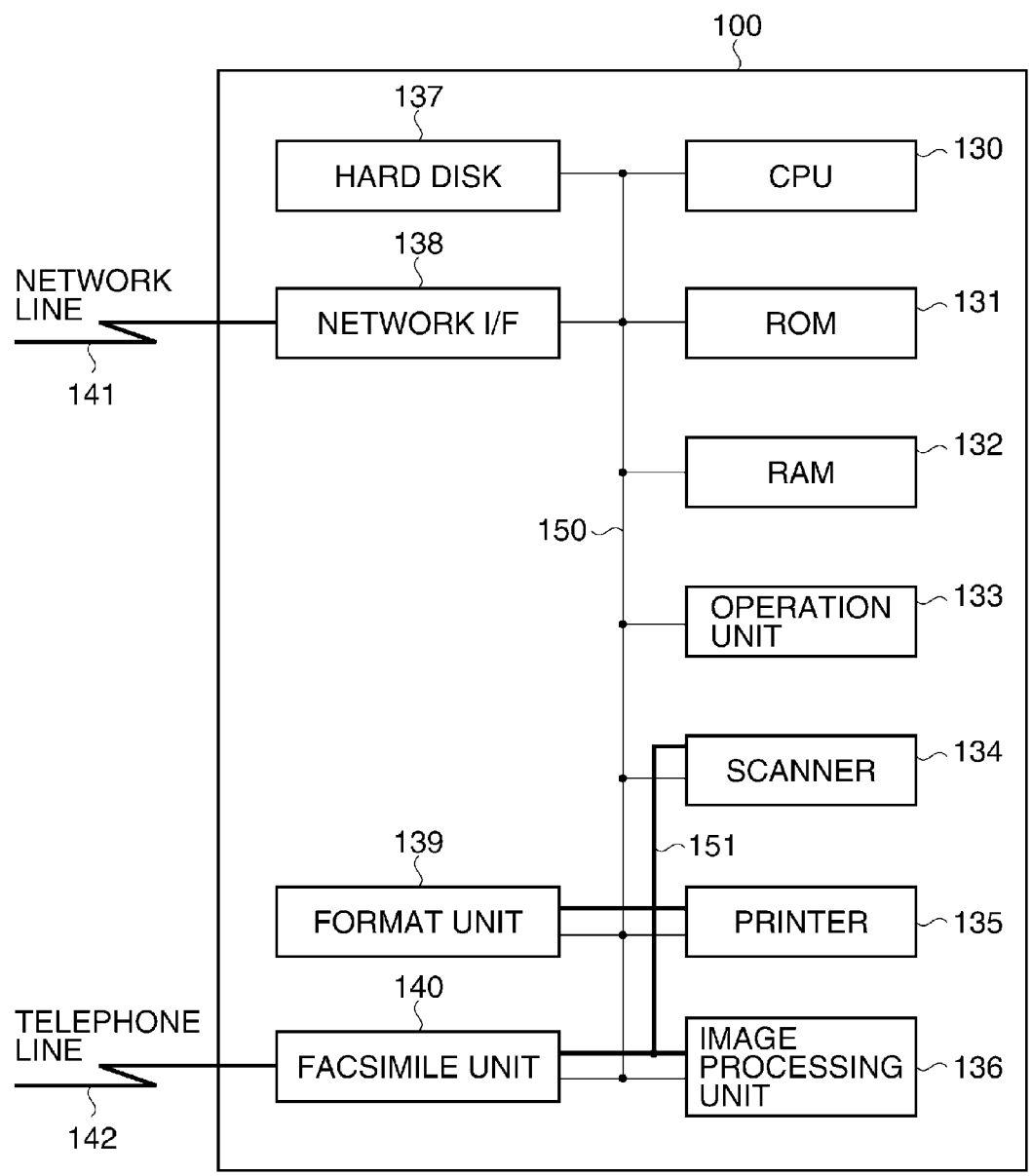

FIG.3

```
300 ~ $ORIGIN 1.0.0.0.0.0.0.0.3.1.8.e164.arpa
301 ~   IN NAPTR 100 10 "u" "E2U+sip"        "!^.*$!sip:info@abc.co.jp!" .
302 ~   IN NAPTR 102 10 "u" "E2U+ifax:mailto" "!^.*$!mailto:info@abc.co.jp!" .
303 ~   IN NAPTR 104 10 "u" "E2U+tel"        "!^(.*$)$!tel:+81300000001!" .

304 ~ $ORIGIN 8.7.6.5.4.3.2.1.3.1.8.e164.arpa
305 ~   IN NAPTR 100 10 "u" "E2U+sip"        "!^.*$!sip:sales@abc.co.jp!" .
306 ~   IN NAPTR 102 10 "u" "E2U+ifax:mailto" "!^.*$!mailto:sales-fax@abc.co.jp!" .

307 ~ $ORIGIN 1.1.1.0.0.0.0.0.3.1.8.e164.arpa
308 ~   IN NAPTR 100 10 "u" "E2U+tel"        "!^(.*$)$!tel:+81300001111!" .

309 ~ $ORIGIN 1.1.1.2.2.2.0.1.6.8.e164.arpa
310 ~   IN NAPTR 100 10 "u" "E2U+sip"           "!^.*$!sip:info@abc.com.cn!" .
311 ~   IN NAPTR 102 10 "u" "E2U+message:mailto" "!^.*$!mailto:info@abc.com.cn!" .
312 ~   IN NAPTR 104 10 "u" "E2U+tel"           "!^(.*$)$!tel:+8610222223333!" .
```

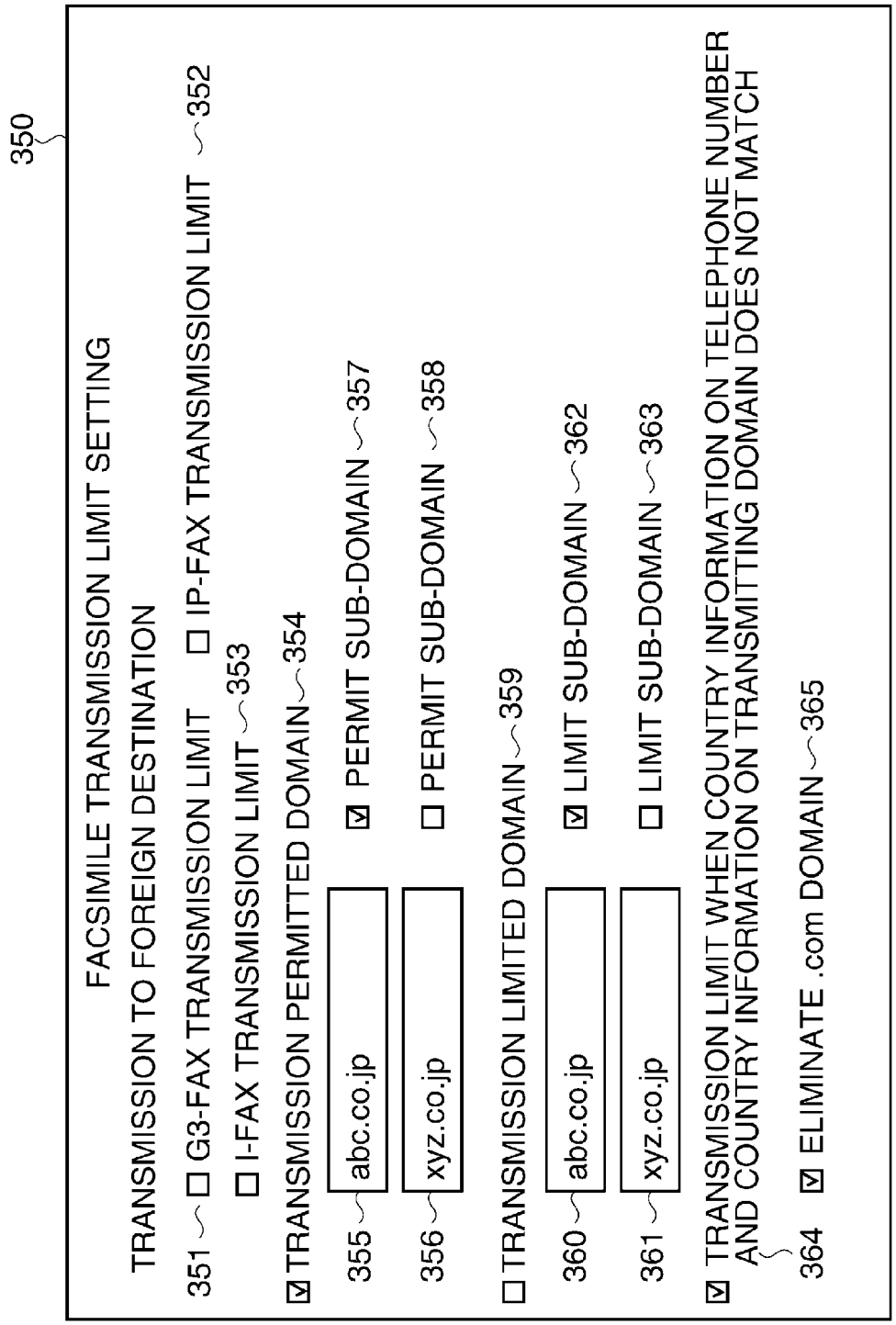

FACSIMILE MACHINE, CONTROL METHOD THEREFOR, AND CONTROL PROGRAM THEREFOR

This application is a U. S. National Phase Application of PCT International Application PCT/JP2010/051457 filed on Jan. 27, 2010 which is based on and claims priority from JP 2009-024855 filed on Feb. 5, 2009 the contents of which is incorporated herein in its entirety by reference.

TECHNICAL FIELD

The present invention relates to a facsimile machine that performs facsimile communication via a network, a control method therefor, and a control program therefor.

BACKGROUND ART

At present, as IP (Internet Protocol) telephones become widespread, facsimile machines that perform facsimile communication via an IP network has appeared in addition to conventional G3 facsimile machines that use a telephone network. The facsimile communication via the IP network is performed according to various systems including an assumed voice system, a real-time system (the ITU-T.38 system), and an e-mail system (the ITU-T.37 system).

Various techniques to prevent leakage of important information such as confidential information to the outside due to an improper transmission have been proposed about facsimile communication. For example, there is a technique to make a user input a telephone number of a destination twice.

For facsimile communication according to the real-time system mentioned above, a technique to prevent a sender from transmitting a facsimile to an unintentional terminal has been proposed (see PTL (Patent Literature) 1). When an alternative address of a destination address has been notified from an SIP (Session Initiation Protocol) server, the technique interrupts communication and limits a facsimile transmission to the alternative address. When the above-mentioned alternative address notified corresponds to a predetermined permission address, the technique permits communication and the facsimile transmission to the alternative address.

For an e-mail, in order to prevent leakage of important information to the outside due to an improper transmission, a technique to limit a transmission of an e-mail to a destination address according to a domain of the destination address is proposed (see PTL 2).

Incidentally, a telephone number converting apparatus with a function to convert a telephone number into a network address is known conventionally. When a facsimile transmission in the real-time system is performed using this telephone number converting apparatus, a telephone number of a transmitting destination is inputted first and the telephone number converting apparatus is requested to convert the inputted telephone number into a network address. And a facsimile transmission is performed by using the network address acquired from the telephone number converting apparatus as a transmitting destination.

However, even if the above-mentioned conventional techniques are adopted, a facsimile may still be transmitted to an unintentional terminal. The following case can be assumed. That is, even if a correct telephone number is inputted first, a network address registered into the telephone number converting apparatus corresponds to an unintentional terminal and an alternative address is not set. In such a case, a facsimile is transmitted to the unintentional terminal.

Conventionally, although it has been known that the image data received using the real-time system is transferred, a facsimile transmission is not limited based on the network address designated as the transmitting destination of the image data. Accordingly, the image data may have been transmitted to a terminal that is not intended by a user.

CITATION LIST

Patent Literature

{PTL 1} Japanese laid-open patent publication (Kokai) No. 2005-94662 (JP2005-94662A)
{PTL 2} Japanese laid-open patent publication (Kokai) No. 2003-44402 (JP2003-44402A)

SUMMARY OF INVENTION

Technical Problem

The present invention provides a mechanism of limiting a facsimile transmission based on a network address converted from an inputted telephone number. Further, the present invention provides a mechanism of limiting a facsimile transmission based on a network address designated as a destination of received image data.

Solution of Problem

Accordingly, a first aspect of the present invention provides a facsimile machine that performs a facsimile transmission via a network using a call control device performing a call control of facsimile communication, the facsimile machine comprising an input unit that inputs a telephone number of a transmitting destination, a setting unit that sets a transmission limit domain to which a facsimile transmission is limited, an acquisition unit adapted to acquire a network address corresponding to the telephone number inputted via the input unit, and a control unit that limits a facsimile transmission of which the transmitting destination is the acquired network address based on a domain of the network address acquired by the acquisition unit and the transmission limit domain set by the setting unit.

Accordingly, a second aspect of the present invention provides a facsimile machine that performs a facsimile transmission via a network using a call control device performing a call control of facsimile communication, the facsimile machine comprising a setting unit that sets a transmission limit domain, an acquisition unit that acquires a network address, which is a transmitting destination of received image data, from a facsimile machine that is a transmitting source of the received image data, and a control unit that limits a facsimile transmission of which the transmitting destination is the acquired network address based on a domain of the acquired network address and the set transmission limit domain.

Accordingly, a third aspect of the present invention provides a control method for a facsimile machine that performs a facsimile transmission via a network using a call control device performing a call control of facsimile communication, the control method comprising, a step of inputting a telephone number of a transmitting destination, a step of setting a transmission limit domain to which a facsimile transmission is limited, a step of acquiring a network address corresponding to the telephone number inputted, and a step of limiting a facsimile transmission of which the transmitting destination is the acquired network address based on a domain of the acquired network address and the set transmission limit domain.

Accordingly, a fourth aspect of the present invention provides a control method for a facsimile machine that performs a facsimile transmission via a network using a call control device performing a call control of facsimile communication, the control method comprising a step of setting a transmission limit domain, a step of acquiring a network address, which is a transmitting destination of received image data, from a facsimile machine that is a transmitting source of the received image data, and a step of limiting a facsimile transmission of which the transmitting destination is the acquired network address based on a domain of the acquired network address and the set transmission limit domain.

Accordingly, a fifth aspect of the present invention provides a control program causing a computer to execute a control method for a facsimile machine.

Further features of the present invention will become apparent from the following description of exemplary embodiments with reference to the attached drawings.

Advantageous Effects of Invention

According to the present invention, the facsimile transmission can be limited based on the network address converted from the inputted telephone number. According to the present invention, the facsimile transmission can be limited based on the network address designated as the destination of the received image data.

BRIEF DESCRIPTION OF DRAWINGS

FIG. 2 is a block diagram schematically showing a configuration of a first MFP shown in FIG. 1.

FIG. 3 is a view showing data set in an ENUM server shown in FIG. 1.

FIG. 4 is a view showing an example of a facsimile transmission limit setting screen displayed on an operation unit of the first MFP in FIG. 1.

DESCRIPTION OF EMBODIMENTS

Hereafter, embodiments according to the present invention will be described with reference to the attached drawings.

Figure 1:
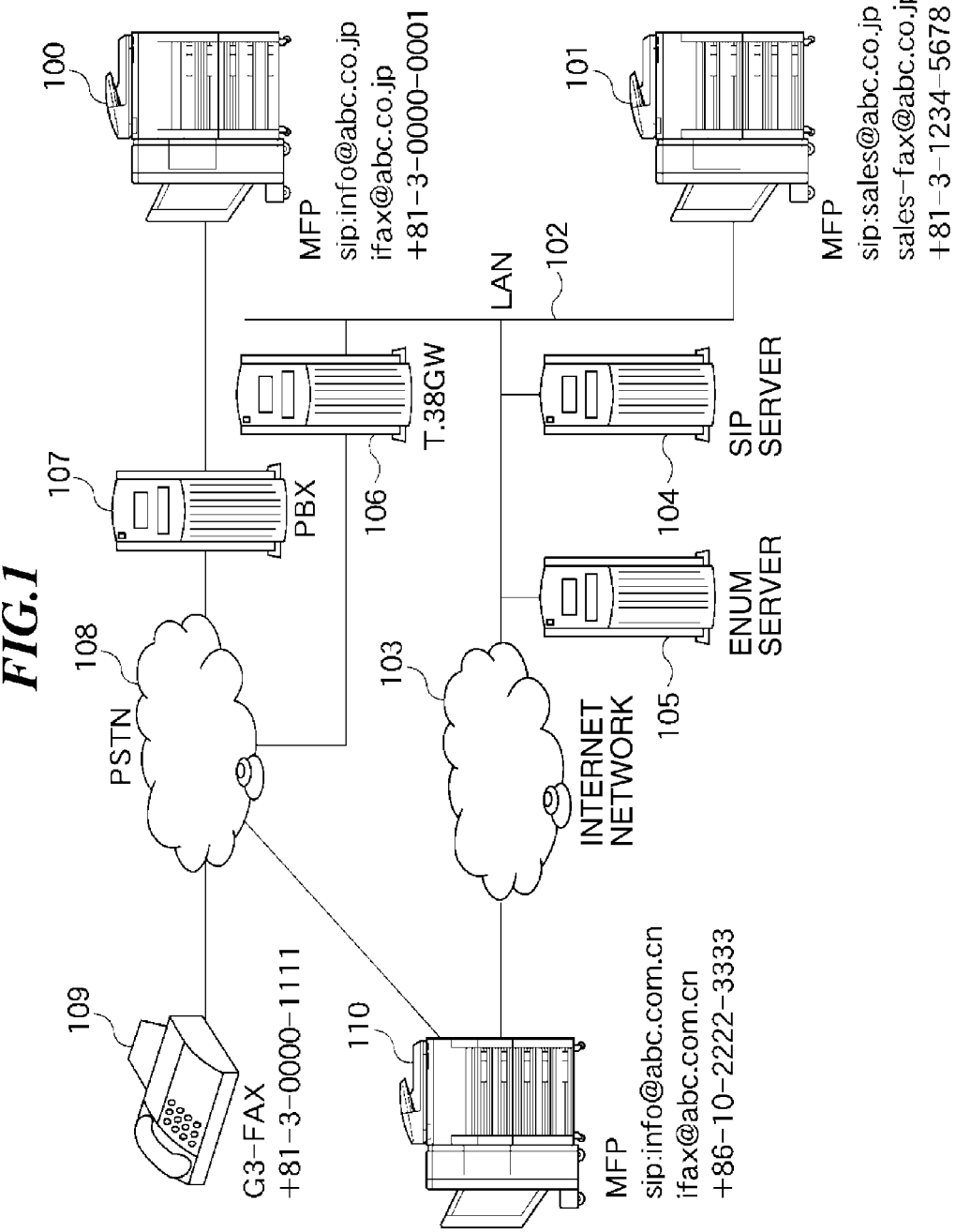
FIG. 1 is a view schematically showing a configuration of a network to which a facsimile machine according to a first embodiment of the present invention is connected.

FIG. 1 is a view schematically showing a configuration of a network to which a facsimile machine according to a first embodiment of the present invention is connected. In this embodiment, an example using a multifunctional peripheral device (i.e., an MFP (a multi-function peripheral)) that has a plurality of functions including a facsimile communication function as the facsimile machine will be described.

In this embodiment, as shown in FIG. 1, a first MFP 100 and a second MFP 101 are connected to a LAN (a local area network) 102. The first and second MFPs 100 and 101 are multifunctional peripheral devices each of which is provided with a scanner, a printer, etc. and achieves a copy function, a printer function, a facsimile function, etc.

An SIP server (a call control device) 104, an ENUM server (a telephone number converting apparatus) 105, and a T.38 gateway (GW) 106 are connected to the LAN 102. The SIP server 104 is a server that performs call control for a facsimile communication according to an SIP (a session initiation protocol) defined by RFC2543 etc.

The ENUM server 105 is a server (RFC2916, E.164) that provides a mechanism (ENUM) that matches a telephone number and a network address using a name space by a telephone number (a telephone number mapping). Specifically, the ENUM server 105 responds to a query including a telephone number, converts the telephone number into a corresponding network address, and returns the network address concerned to the query source.

The T.38 gateway 106 converts data of a T.38 protocol on the LAN 102 into data of a T.30 protocol on a PSTN 108, and converts inversely.

Here, the first and second MFPs 100 and 101 achieve facsimile communication (referred to as an I-FAX, hereinafter) according to a T.37 protocol (an e-mail system) using the setup e-mail address. The first and second MFPs 100 and 101 achieve a facsimile communication function (referred to as an IP-FAX, hereinafter) according to the T.38 protocol (a real-time system). The above-mentioned T.38 protocol is a protocol that develops the T.30 protocol of a G3-FAX that communicates through a telephone line onto an IP network. The first and second MFPs 100 and 101 can perform facsimile communication with a G3-FAX machine 109 via the T.38 gateway 106.

The first MFP 100 achieves facsimile communication of the G3-FAX according to the T.30 protocol. The first MFP 100 is connected to a PBX (a private branch exchange) 107, and can be connected to a PSTN (a public switched telephone network) 108 via the PBX 107 concerned. Accordingly, the first MFP 100 can perform the G3-FAX communication with the G3-FAX machine 109, a third MFP 110 that can perform the G3-FAX communication, etc. via the PSTN 108.

For each MFP 100, 101, and 110, an SIP-URI, an e-mail address defined by the T.37, and a telephone number defined by the E.164 are given for the facsimile communication of the above-mentioned IP-FAX, I-FAX, and G3-FAX, respectively, as shown in Table 1, for example.

TABLE 1

| MACHINE NAME | SIP-URI (IP ADDRESS) | E-MAIL ADDRESS | TELEPHONE NUMBER |
|---|---|---|---|
| MFP 100 | sip:info@abc.co.jp | ifax@abc.co.jp | +81-3-0000-0001 |
| MFP 101 | sip:sales@abc.co.jp | sales-fax@abc.co.jp | +81-3-1234-5648 |
| MFP 110 | sip:info@abc.com.cn | ifax@abc.com.cn | +86-10-2222-3333 |
| G3-FAX APPARATUS 109 | — | — | +86-3-0000-1111 |

Next, a configuration of the first MFP 100 will be described with reference to FIG. 2. FIG. 2 is a block diagram showing the configuration of the first MFP 100 shown in FIG. 1.

The first MFP 100 has a CPU 130, a ROM 131, and a RAM 132, as shown in FIG. 2. The CPU 130 controls the entire system of the first MFP 100 according to a program stored in the ROM 131. The RAM 132 provides a working area for the CPU 130 and an area for temporarily storing data.

An operation unit 133, a scanner 134, a printer 135, an image processing unit 136, a hard disk 137, a network I/F (interface) 138, a format unit 139, and a facsimile unit 140 are connected to the CPU 130 via a CPU bus 150.

The operation unit 133 has a liquid crystal display panel, and a plurality of hardkeys including a start key, a ten-digit keypad, etc. Soft buttons, an operation screen for setting a mode etc., and information showing a condition of the machine are displayed on the liquid crystal display panel.

The scanner 134 scans an original fed from an original feeding device onto a platen glass, and reads an image on the original concerned. Image data of the read original is converted into digital data, and then outputted. The printer 135 is an electrophotographic printer. The image processing unit 136 has an image memory, and performs various kinds of image processings such as a rotation of an image, expansion and reduction, coding of an image by MH, MR, MMR, JBIG, and JPEG systems and decoding thereof, shading, trimming, and masking.

The hard disk 137 is a large capacity recording medium connected by an I/F such as SCSI and IDE. The hard disk 137 stores image data, programs for controlling operation of the first MFP 100, etc. The network I/F 138 executes network data link to connect with a network line 141 such as the Ethernet (registered trademark) that is represented by the 10BASE-T and the 100BASE-T, and the Token Ring. The format unit 139 analyzes a PDL (a page description language) data, and generates image data that can be processed by the printer 135. The facsimile unit 140 has an NCU (a network control unit), a modem, etc., and is connected with a telephone line 142.

When the network I/F 138 receives the PDL (page description language) data from a personal computer, the format unit 139 analyzes the PDL data concerned and generates image data. The generated image data is processed in the image processing unit 136, and then, printed by the printer 135.

Since the scanner 134, the printer 135, the image processing unit 136, the format unit 139, and the facsimile unit 140 are connected by a high-speed video bus 151 that is different from the CPU bus 150, the image data can be transferred in high speed. A copy function and a facsimile function are achieved using this high-speed video bus 151.

Here, although the configuration of the first MFP 100 has been described, the second and third MFPs 101 and 110 have the same configuration, and the duplicated description will be omitted.

Next, a data configuration set in the ENUM server 105 will be described with reference to FIG. 3. FIG. 3 is a view showing data set in the ENUM server 105 shown in FIG. 1.

Data pieces 300 through 312 are set in the ENUM server 105 as shown in FIG. 3. Here, the data pieces 300 through 303 relate to the first MFP 100. The data piece 300 comprises a character string of the telephone number of the first MFP 100 arranged in reverse and divided by dots, and a character string of "e164.arpa". The data piece 301 shows an SIP-URI (sip:info@abc.co.jp) of the first MFP 100, and a given weight "100". The data piece 302 shows an e-mail address (ifax@abc.co.jp) of the first MFP 100 in the T.37, and a given weight "102". The data piece 303 shows the facsimile telephone number (+81-3-0000-0001) of the first MFP 100 and a given weight "104".

Therefore, when the telephone number "+81-3-0000-0001" is inquired to the ENUM server 105, the above-mentioned data will be returned to a query source. At the query source, the data with the smallest weight among the data pieces 301 through 303 is used as a destination. If an obstacle such as a blockage occurs in the communication with the used destination, the data with the next smallest weight will be used as the destination.

The data pieces 304 through 306 relate to the second MFP 101. The data piece 304 comprises a character string of the telephone number of the second MFP 101 arranged in reverse and divided by dots, and a character string of "e164.arpa". The data piece 305 shows an SIP-URI (sip:sales@abc.co.jp) of the second MFP 101, and a given weight "100". The data piece 306 shows an e-mail address (sales-fax@abc.co.jp) of the second MFP 101 in the T.37, and a given weight "102".

Therefore, when the telephone number "+81-3-1234-5678" is inquired to the ENUM server 105, the above-mentioned data will be returned to the query source. At the query source, the data with the smallest weight among the pieces of data is used as a destination. If an obstacle such as a blockage occurs in the communication with the used destination, the data with the next smallest weight will be used as the destination.

The data pieces 307 and 308 relate to the G3-FAX machine 109. The data piece 307 comprises a character string of the telephone number of the G3-FAX machine 109 arranged in reverse and divided by dots, and a character string of "e164.arpa". The data piece 308 shows the facsimile telephone number (+81-3-0000-1111) of the G3-FAX machine 109, and a given weight "100".

Therefore, when the telephone number "+81-3-0000-1111" is inquired to the ENUM server 105, the above-mentioned data will be returned to the query source.

The data pieces 309 through 312 relate to the third MFP 110. The data piece 309 comprises a character string of the telephone number of the third MFP 110 arranged in reverse and divided by dots, and a character string of "e164.arpa". The data piece 310 shows an SIP-URI (sip:info@abc.com.cn) of the third MFP 100, and a given weight "100". The data piece 311 shows an e-mail address (info@abc.com.cn) of the third MFP 110 in the T.37, and a given weight "102". The data piece 312 shows the facsimile telephone number (+86-10-2222-3333) of the third MFP 110, and a given weight "104".

Therefore, when the telephone number "+86-10-2222-3333" is inquired to the ENUM server 105, the above-mentioned data will be returned to the query source. At the query source, the data with the smallest weight among the pieces of data is used as a destination. If an obstacle such as a blockage occurs in the communication with the used destination, the data with the next smallest weight will be used as the destination.

Next, a setting of a facsimile transmission limit will be described with reference to FIG. 4. FIG. 4 is a view showing an example of a facsimile transmission limit setting screen displayed on the operation unit 133 of the first MFP 100 in FIG. 1.

In this embodiment, a transmission limit can be set for a desired facsimile transmission system among a plurality of facsimile transmission systems. Only a system manager has authority to perform the setting concerned. Therefore, when a facsimile transmission limit is set in the first MFP 100, only the system manager can display the facsimile transmission limit setting screen on the operation unit 133, and can set a transmission limit for a desired facsimile transmission system using the facsimile transmission limit setting screen concerned. On the other hand, other users cannot display the facsimile transmission limit setting screen, and cannot browse.

The first MFP 100 has the facsimile-transmission functions to perform the G3-FAX transmission, the I-FAX transmission, and the IP-FAX transmission, as mentioned above. The system manager can set a limit of transmitting about a desired facsimile transmission system among the above-mentioned facsimile transmission systems.

When limiting a transmission for a desired facsimile transmission system among the G3-FAX transmission, the I-FAX transmission, and the IP-FAX transmission in the first MFP 100, the system manager performs an operation to display the facsimile transmission limit setting screen on the operation unit 133 of the first MFP 100. This operation makes the operation unit 133 display a screen 350 as shown in FIG. 4 as the facsimile transmission limit setting screen, for example.

The facsimile transmission limit setting screen 350 is prepared for setting a transmission limit for the facsimile transmission systems (the G3-FAX transmission, the IP-FAX transmission, and the I-FAX transmission) used when performing a facsimile transmission to a foreign transmitting destination. Check boxes 351 through 353 are displayed for a G3-FAX transmission limit, an IP-FAX transmission limit, and an I-FAX transmission limit. If a desired check box among the check boxes 351 through 353 is checked (i.e., if a check mark is inputted), a transmission by the facsimile transmission system of which the check box is checked will be limited.

For example, if a check mark is inputted in the check box 351 for the G3-FAX transmission limit, it is determined whether the transmitting destination concerned is a foreign destination or not according to the telephone number of the transmitting destination. And if the transmitting destination is a foreign destination, the G3-FAX transmission is limited. If a check mark is inputted in the check box 352 for the IP-FAX transmission limit, it is determined whether the transmitting destination concerned is a foreign destination or not according to the telephone number etc. of the transmitting destination. And if the transmitting destination is a foreign destination, the IP-FAX transmission is limited. Details of the IP-FAX transmission limit will be described below. For example, if a check mark is inputted in the check box 353 for the I-FAX transmission limit, it is determined whether the transmitting destination concerned is a foreign destination or not according to the e-mail address of the transmitting destination. And if the transmitting destination is a foreign destination, the I-FAX transmission is limited.

Further, the screen 350 includes a check box 354 for setting transmitting destination domains for which the IP-FAX transmission and the I-FAX transmission are permitted (transmission permitted domains), and input columns 355 and 356 for inputting domain names of transmitting destinations for which the IP-FAX transmission and the I-FAX transmission are permitted. Still further, the screen 350 includes check boxes 357 and 358 for setting whether the IP-FAX transmission and the I-FAX transmission are permitted for sub-domains of the inputted domain names.

In this example, a domain name "abc.co.jp" is inputted into the input column 355, and a check mark is inputted to the check box 357 that permits the sub-domain. Therefore, in this case, the facsimile transmission (the IP-FAX transmission or I-FAX transmission) is permitted to a sub-domain such as "sales.abc.co.jp".

The screen 350 includes a check box 359 for setting transmitting destination domains for which the IP-FAX transmission and the I-FAX transmission are limited (transmission limited domains), and input columns 360 and 361 for inputting domain names of transmitting destinations for which the IP-FAX transmission and the I-FAX transmission are limited. Still further, the screen 350 includes check boxes 362 and 363 for setting whether the IP-FAX transmission and the I-FAX transmission are limited for sub-domains of the inputted domain names.

In this example, a domain name "abc.co.jp" is inputted into the input column 360, and a check mark is inputted to the check box 362 that permits the sub-domain. Therefore, in this case, a facsimile transmission (IP-FAX transmission or I-FAX transmission) is limited for a sub-domain such as "sales.abc.co.jp".

The screen 350 includes a check box 364 for setting a transmission limit when country information on a telephone number of a transmitting destination does not match country information on a transmitting destination domain. If a check mark is inputted in the check box 364, it is determined whether the country information on the telephone number of the transmitting destination matches the country information on the transmitting destination domain or not. If it is determined that the country information on the telephone number of the transmitting destination does not match the country information on the transmitting destination domain, the IP-FAX transmission will be limited.

The screen 350 includes a check box 365. When a check mark is inputted in the check box 364, a ".com" domain (a specific domain) is not determined as a domain in the United States. Originally, although the ".com" domain is a domain in the United States, it might be expanded to other countries. Therefore, an input of a check mark in the check box 365 can prevent a ".com" domain from determining as a domain in the United States when it is determined whether the country information on the telephone number of the transmitting destination matches the country information on the domain. That is, the ".com" domain does not become a target of the determination of whether the country information on the telephone number of the transmitting destination matches the country information on the domain.

Contents that have been set using the facsimile transmission limit setting screen 350 are stored into the hard disk 137.

Figure 5:
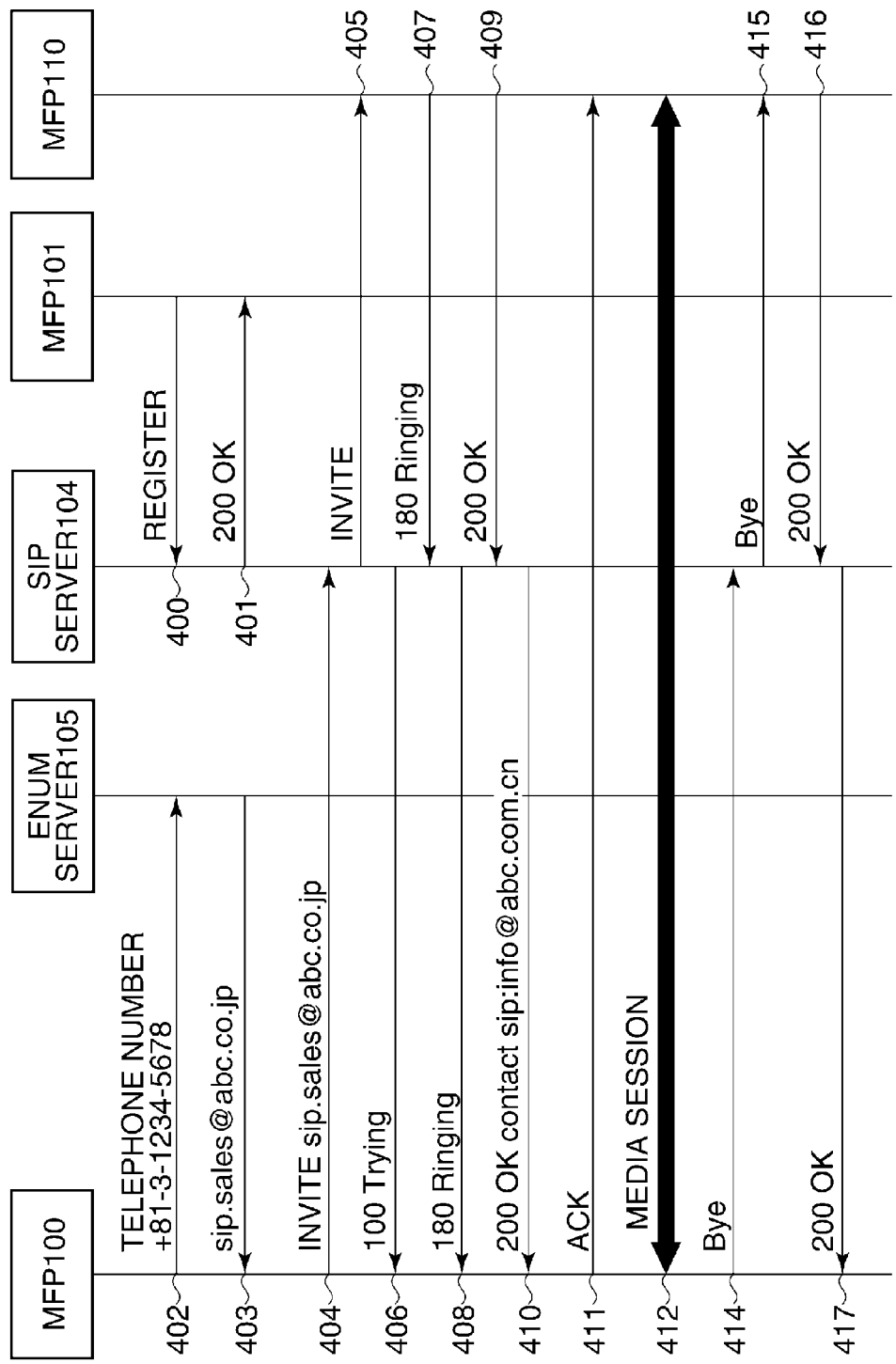
FIG. 5 is a view showing a sequence when an IP-FAX transmission is performed from the first MFP to a second MFP to which a third MFP is set as a receiving destination.

Next, a procedure when the IP-FAX transmission is performed from the first MFP 100 to the second MFP 101 will be described with reference to FIG. 5. FIG. 5 is a view showing a sequence when the IP-FAX transmission is performed from the first MFP 100 to the second MFP 101 to which the third MFP 110 is set as a receiving destination.

Here, it is assumed that a user of the second MFP 101 sets up to receive facsimile data by the third MFP 110 instead of the second MFP 101. When the setting is performed, the second MFP 101 transmits "REGISTER" to the SIP server 104 (400), as shown in FIG. 5. The "REGISTER" is a message for setting the third MFP 110 as a receiving destination. Receiving the "REGISTER", the SIP server 104 changes the receiving destination of facsimile data, which is originally directed to the second MFP 101, from the second MFP 101 to the third MFP 110, and returns "200 OK" to the second MFP 101 (401). Thus, it is set so that the facsimile data of which the original receiving destination is the second MFP 101 is received by the third MFP 110.

When the first MFP 100 executes the IP-FAX transmission to the second MFP 101 as a receiving destination, the first MFP 100 inquires to the ENUM server 105 by designating "+81-3-1234-5678" that is the telephone number of the second MFP 101 (402). Receiving the query, the ENUM server 105 returns the data 305 and 306 shown in FIG. 3 (403).

The first MFP 100 sets the data with the lower weight between the pieces of data 305 and 306 that have been returned from the ENUM server 105 (i.e., "sip:sales@abc.co.jp") as the destination of the IP-FAX transmission. And the first MFP 100 issues a connection request to "sip:sales@abc.co.jp" with an INVITE command to the SIP server 104 (404). Receiving the connection request, the SIP server 104 issues the "INVITE" to the third MFP 110 instead of the second MFP 101 (405). The SIP server 104 returns a provisional message of "100 Trying", which shows that the "INVITE" is executing, to the first MFP 100 (406).

Receiving the above-mentioned "INVITE", the third MFP 110 transmits a provisional message of "180 Ringing" to the SIP server 104 (407). Receiving the provisional message, the SIP server 104 transmits a provisional message of "180 Ringing" to the first MFP 100 (408).

When standing ready to receive, the third MFP 110 returns "200 OK" to the SIP server 104 (409). Then, the SIP server 104 returns "200 OK" to the first MFP 100 (410). Here, the message of "200 OK" from the SIP server 104 includes a contact header (or an accept-contact header), and the information (sip:info@abc.com.cn) about the third MFP 110 that actually perform communications is described in this header.

The first MFP 100 determines whether a transmission to the destination shown by the information concerned generates a problem or not according to the above-mentioned contact header. When it is determined that there is no problem, the first MFP 100 transmits "ACK" to the third MFP 110 (411).

After transmitting the "ACK", a media session starts between the first MFP 100 and the third MFP 110 (412), and the first MFP 100 transmits image data to the third MFP 110 according to the T.38 protocol.

After finishing the transmission of the image data (after finishing the media session), the first MFP 100 transmits "Bye" to the SIP server 104 (414), and the SIP server 104 transmits "Bye" to the third MFP 110 (415). Receiving the "Bye", the third MFP 110 finishes the receiving process, and transmits "200 OK" to the SIP server 104 (416). Receiving the "200 OK", the SIP server transmits "200 OK" to the first MFP 100 (417).

Receiving the "200 OK", the first MFP 100 checks that the transmission has been completed normally, and finishes the transmission process. In this case, the first MFP 100 records the telephone number "+81-3-1234-5678" and the information on "sip:info@abc.com.cn" that has actually performed communications into a transmission log. The first MFP 100 prints and outputs a transmission result report in which the information recorded in the transmission log and the image in the first page of the transmission image are mentioned.

Figure 6:
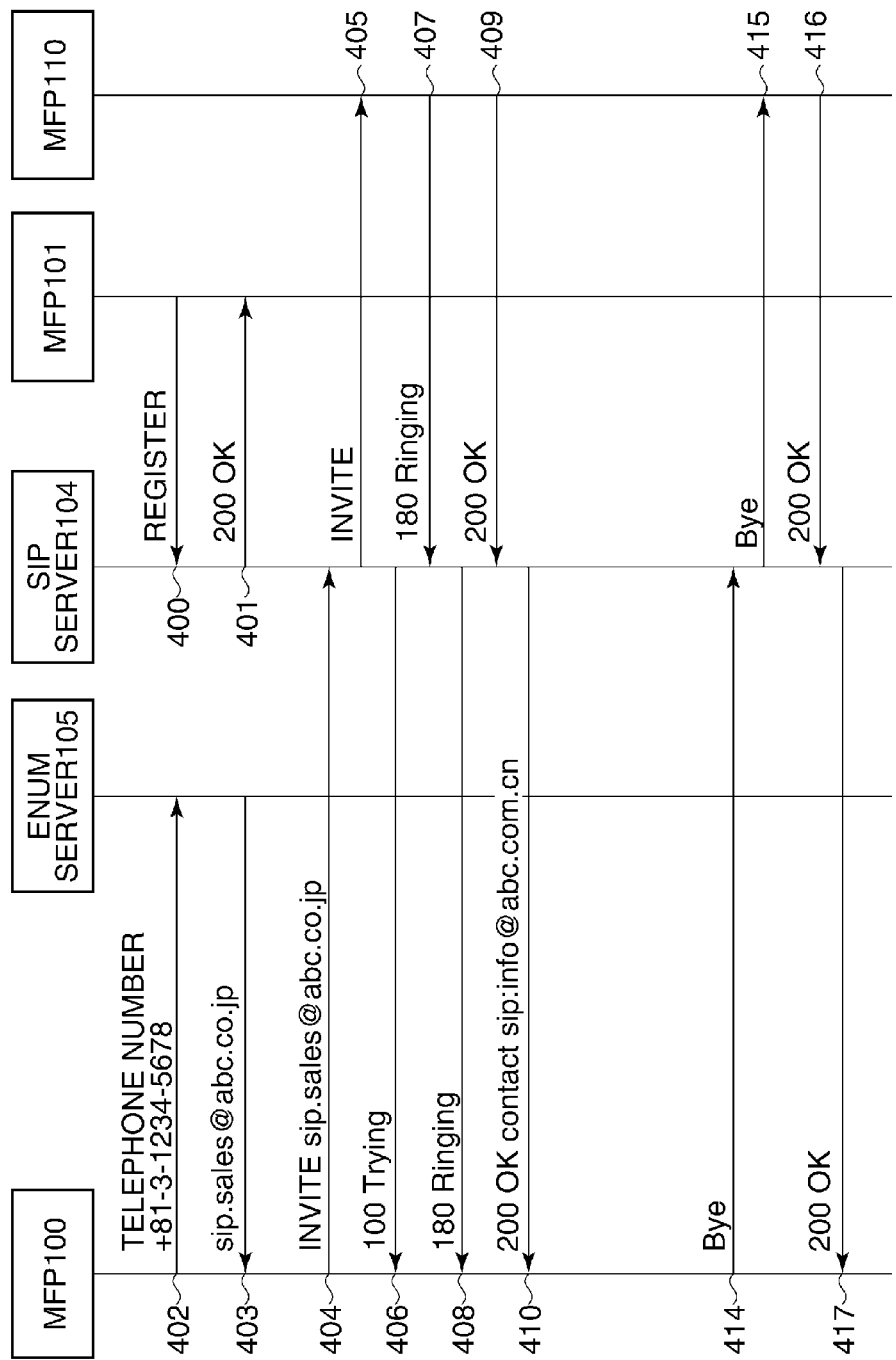
FIG. 6 is a view showing a sequence when the first MFP to which a limit of the IP-FAX transmission is set performs the IP-FAX transmission to the second MFP to which the third MFP is set as the receiving destination.

Next, a procedure when the IP-FAX transmission is performed to the second MFP 101 from the first MFP 100 to which a limit of the IP-FAX transmission is set will be described with reference to FIG. 6. FIG. 6 is a view showing a sequence when the first MFP 100 to which the limit of the IP-FAX transmission is set performs the IP-FAX transmission to the second MFP 101 to which the third MFP 110 is set as the receiving destination.

Here, it is assumed that the limit of the IP-facsimile transmission is set to the first MFP 100 using the facsimile transmission limit setting screen (FIG. 4). Here, it is assumed that the second MFP 101 is set so that the third MFP 110 receives facsimile data instead of the second MFP 101.

Here, as shown in FIG. 6, the sequence to set so that facsimile data is received by the third MFP 110 instead of the second MFP 101 in the second MFP 101 is the same as the sequence shown in FIG. 5 mentioned above.

When the first MFP 100 executes the IP-FAX transmission to the second MFP 101 as a receiving destination, the first MFP 100 inquires to the ENUM server 105 by designating "+81-3-1234-5678" that is the telephone number of the second MFP 101 (402). The sequence after the query until the SIP server 104 returns "200 OK" to the first MFP 100 (410) is the same as the sequence shown in FIG. 5.

The first MFP 100 determines whether the IP-FAX transmission to a destination indicated by a transmitting-destination information is limited based on the transmitting-destination information (sip:info@abc.com.cn) of the contact header (or the Accept-contact header) included in the above-mentioned "200 OK". Here, since the domain of the transmitting-destination information (sip:info@abc.com.cn) of the contact header is included in the transmission limit domains (FIG. 4), it is determined that the IP-FAX transmission is limited.

Therefore, the first MFP 100 transmits "Bye" to the SIP server 104 (414), and the SIP server 104 transmits "Bye" to the third MFP 110 (415). Receiving the "Bye", the third MFP 110 transmits "200 OK" to the SIP server 104 (416), and the SIP server 104 transmits "200 OK" to the first MFP 100 (417). Receiving the "200 OK", the first MFP 100 finishes the process without performing the IP-FAX transmission. In this case, the first MFP 100 records the information representing a transmission error due to the transmission limit, the telephone number "+81-3-1234-5678", the transmitting-destination information including the actual destination "sip:info@abc.com.cn", etc. into the transmission log.

Figure 7:
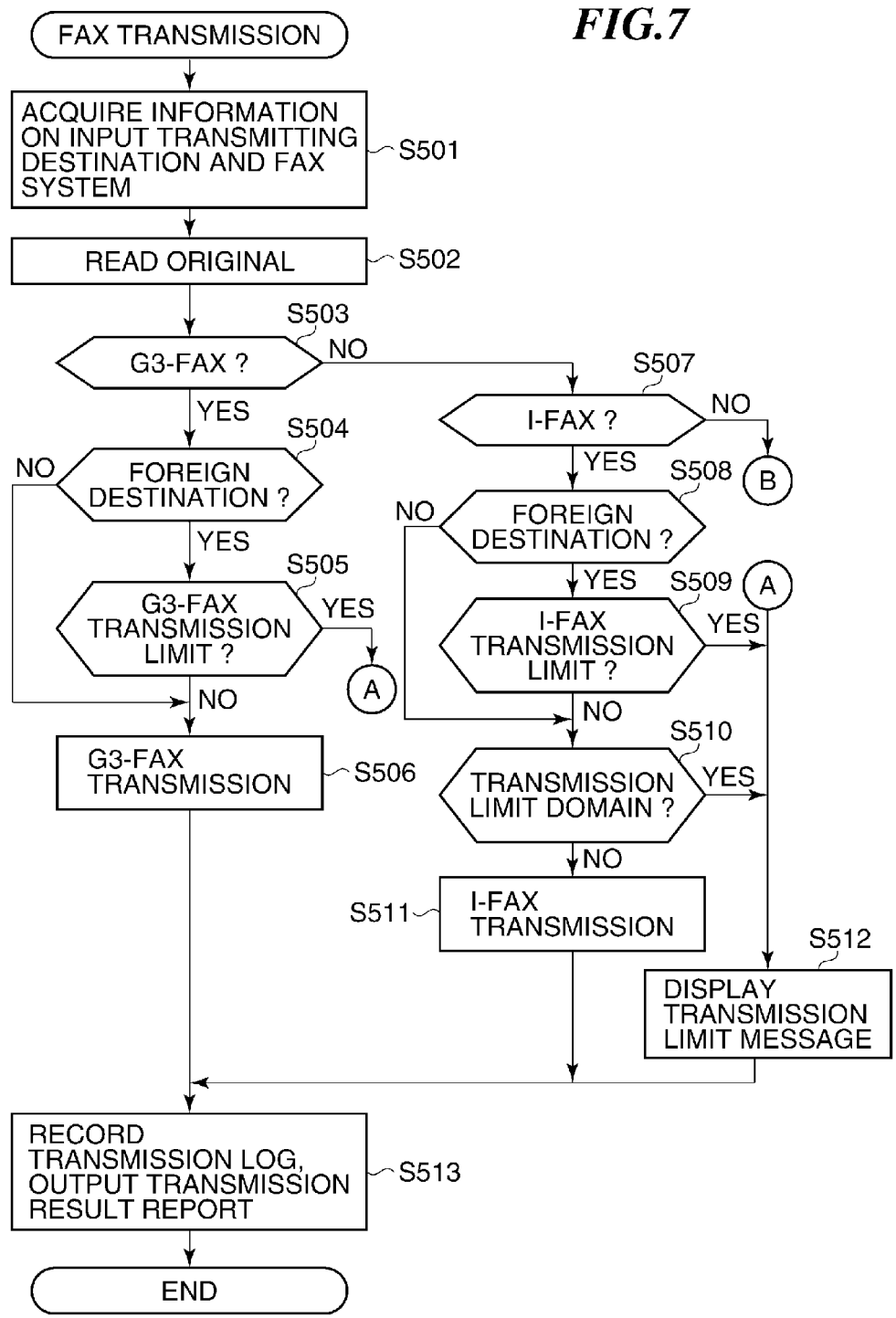
FIG. 7 is a flowchart showing operation procedures when the first MFP performs a facsimile transmission.
Figure 8:
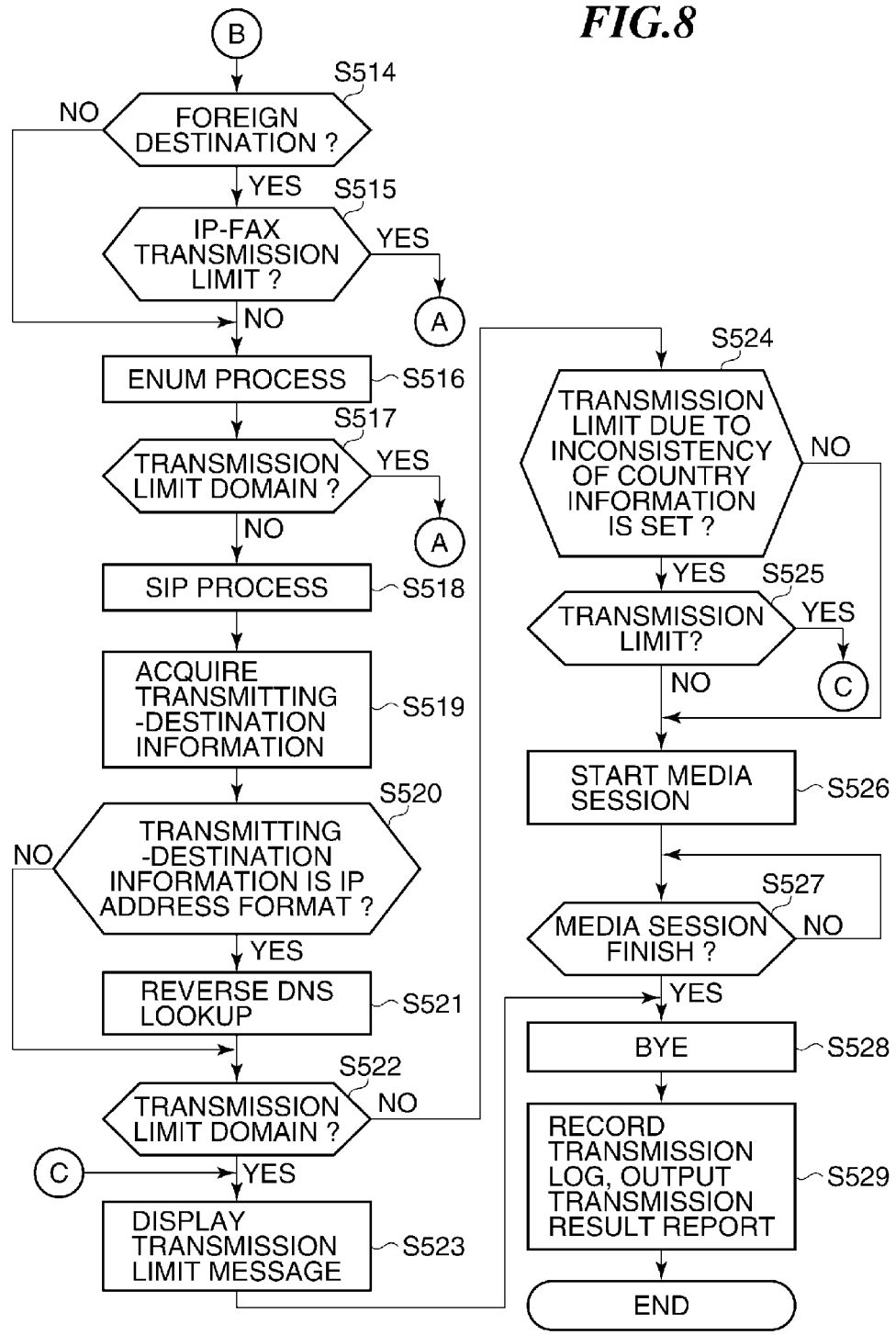
FIG. 8 is a flowchart showing operation procedures when the first MFP performs the facsimile transmission.

Next, an operation when the first MFP 100 performs the facsimile transmission will be described with reference to FIG. 7 and FIG. 8. FIG. 7 and FIG. 8 are flowcharts showing operation procedures when the first MFP 100 performs the facsimile transmission. The procedures shown in FIG. 7 and FIG. 8 are executed by the CPU 130 according to the program stored in the ROM 131 or the hard disk 137.

When a user performs the facsimile transmission using the first MFP 100, a facsimile transmission screen (not shown) is displayed on the operation unit 133 of the first MFP 100 in response to an operation of the user. This facsimile transmission screen is used to input information on facsimile transmission such as facsimile transmitting-destination information (a telephone number and an e-mail address of a transmitting destination), and information showing a facsimile system (the G3-FAX, the IP-FAX, or the I-FAX) to be used. If the start key is pressed after the information on the facsimile transmission are inputted, the process for the facsimile transmission starts.

If the start key is pressed, as shown in FIG. 7, the CPU 130 acquires the information on the facsimile transmission inputted through the facsimile transmission screen (step S501). In this case, as mentioned above, the transmitting-destination information (the telephone number or the e-mail address of the transmitting destination) and the facsimile system (G3-FAX, IP-FAX, I-FAX) that have been inputted are acquired. And then, the CPU 130 controls the scanner 134 to read an original (step S502).

Subsequently, the CPU 130 determines whether the facsimile system inputted is the G3-FAX or not (step S503). When it is determined that the facsimile system inputted is the G3-FAX, the CPU 130 determines whether a transmitting destination is a foreign transmitting destination based on the transmitting-destination information inputted (step S504). When the facsimile system inputted is the G3-FAX, the telephone number of the transmitting destination has been inputted as the transmitting-destination information.

When it is determined that the transmitting destination is a foreign transmitting destination in the step S504, the CPU 130 determines whether the limit of the G3-FAX transmission is set (step S505). When it is determined that the limit of the G3-FAX transmission is not set, the CPU 130 performs the G3-FAX transmission (step S506). In this case, the facsimile unit 140 transmits image data read by the scanner 134 via the telephone line 142. Then, the CPU 130 records the transmission log, and outputs the transmission result report (step S513). In this case, the information indicating the transmission end, the transmitting-destination information (the telephone number), etc. are recorded in the transmission log. The transmission result report in which the information recorded in the transmission log and the image on the first page of the transmission image are mentioned is printed and outputted. And the CPU 130 finishes this process.

When it is determined that the transmitting destination is not a foreign transmitting destination in the step S504, the CPU 130 performs the G3-FAX transmission (step S506), records the transmission log, and outputs the transmission result report (step S513). And the CPU 130 finishes this process.

When it is determined that the limit of the G3-FAX transmission is set in the step S505, the CPU 130 displays a message indicating the limit of the G3-FAX transmission onto the operation unit 133 (step S512). Next, the CPU 130 records the information representing a transmission error due to the transmission limit and the transmitting-destination information (telephone number) into the transmission log, and prints and outputs the transmission result report that mentions the information recorded in the transmission log (step S513). And the CPU 130 finishes this process.

When it is determined that the facsimile system inputted is not the G3-FAX in the step S503, the CPU 130 determines whether the facsimile system inputted is the I-FAX (step S507). When it is determined that the facsimile system inputted is the I-FAX, the CPU 130 determines whether the transmitting destination is a foreign transmitting destination based on the transmitting-destination information inputted (step S504). When the facsimile system inputted is the I-FAX, an e-mail address is inputted as the transmitting-destination information. Therefore, it is determined whether the transmitting destination is a foreign destination or not based on the country information on the domain of the e-mail address.

When it is determined that the transmitting destination is a foreign transmitting destination in the step S508, the CPU 130 determines whether the limit of the I-FAX transmission is set (step S509). When it is determined that the limit of the I-FAX transmission is not set, the CPU 130 determines whether the domain of the transmitting-destination information (the e-mail address) corresponds to the transmission limit domains (FIG. 4) that have been set (step S510). When it is determined that the domain of the e-mail address does not correspond to the transmission limit domains, the CPU 130 performs the I-FAX transmission using the e-mail address (step S511). In this case, an e-mail to which image data read by the scanner 134 is attached is transmitted to the e-mail address as the destination. Then, the CPU 130 records the transmission log, and outputs the transmission result report (step S513). The information indicating the transmission end, the transmitting-destination information (the telephone number), etc. are recorded in the transmission log. The information recorded in the transmission log etc. are mentioned in the transmission result report. And the CPU 130 finishes this process.

When it is determined that the transmitting destination is not a foreign transmitting destination in the step S508, the CPU 130 determines whether the domain of the transmitting-destination information (the e-mail address) corresponds to the transmission limit domains (step S510).

When it is determined that the limit of the I-FAX transmission is set in the step S509, the CPU 130 displays a message indicating the limit of the I-FAX transmission onto the operation unit 133 (step S512). Next, the CPU 130 records the information representing a transmission error due to the transmission limit and the transmitting-destination information (the e-mail address) into the transmission log, and prints and outputs the transmission result reports that mentions the information recorded in the transmission log (step S513). And the CPU 130 finishes this process.

When it is determined that the domain of the transmitting-destination information (the e-mail address) corresponds to the transmission limit domains in the step S510, the CPU 130 displays the message indicating the limit of the I-FAX transmission (step S512). Next, the CPU 130 records the information representing a transmission error due to the transmission limit and the transmitting-destination information (the e-mail address) into the transmission log, and prints and outputs the transmission result report that mentions the information recorded in the transmission log (step S513). And the CPU 130 finishes this process.

When it is determined that the facsimile system inputted is not the I-FAX in the step S507, the facsimile system inputted is the IP-FAX. In this case, as shown in FIG. 8, the CPU 130 determines whether the transmitting destination is a foreign transmitting destination based on the transmitting-destination information inputted (step S514). When the facsimile system inputted is the IP-FAX, the telephone number is inputted as the transmitting-destination information. Therefore, it is determined whether the transmitting destination is a foreign transmitting destination or not based on country information on the telephone number.

When it is determined that the transmitting destination is a foreign transmitting destination in the step S514, the CPU 130 determines whether the limit of the IP-FAX transmission (FIG. 4) is set (step S515). When it is determined that the limit of the IP-FAX transmission is not set, the CPU 130 performs an ENUM process (step S516). As mentioned above, the ENUM process inquires the ENUM server 105 by designating the telephone number of the transmitting destination, and acquires the transmitting-destination information (the network address) that is returned from the ENUM server 105 in response to the query (402 and 443 in FIG. 5 or FIG. 6). If the acquired transmitting-destination information (the network address) is indicated in the IP address format, the domain of the transmitting-destination information (the network address) can be acquired by a reverse DNS lookup. When it is determined that the transmitting destination is not a foreign transmitting destination in the step S514, the CPU 130 performs the ENUM process similarly (step S516).

Next, the CPU 130 determines whether the domain of the transmitting-destination information corresponds to the transmission limit domains that have been set (step S517). When it is determined that the domain of the transmitting-destination information does not correspond to the transmission limit domains, the CPU 130 performs an SIP process (step S518). The SIP process performs a call control according to the sequence of 403 through 410 in FIG. 5 or FIG. 6. The CPU 130 acquires the transmitting-destination information included in the information (the information on the contact header or the accept-contact header) returned from the SIP server 104 according to the SIP process (step S519).

Subsequently, the CPU 130 determines whether the transmitting-destination information acquired is indicated in the IP address format (step S520). When it is determined that the transmitting-destination information acquired is indicated in the IP address format, the CPU 130 performs the reverse DNS lookup and acquires the domain of the transmitting-destination information (step S521). The CPU 130 determines whether the domain of the transmitting-destination information corresponds to the transmission limit domains that have been set (step S522). When it is determined that the domain of the transmitting-destination information acquired is not indicated in the IP address format in the step S520, the CPU 130 determines whether the domain of the transmitting-destination information corresponds to the transmission limit domains (step S522).

When it is determined that the domain of the transmitting destination does not correspond to the transmission limit domains in the step S522, the CPU 130 determines whether the transmission limit due to inconsistency of the country information (FIG. 4) is set (step S524). When the transmission limit due to inconsistency of the country information is set, the transmission is limited when the country information on the telephone number of the transmitting destination does not match the country information on the domain of the IP address. For example, in the case of FIG. 6, although the telephone number "+81-3-1234-5678" of the transmitting destination is a telephone number in Japan, the country information on the domain of the transmitting-destination information "sip:info@abc.com.cn" indicates China. So, in this case, the country information on the telephone number of the transmitting destination does not match the country information on the domain of the IP address of the transmitting destination.

When it is determined that the transmission limit due to inconsistency of the country information is set in the step S524, the CPU 130 determines whether the IP-FAX transmission to the transmitting destination should be limited or not (step S525). In this case, it is determined whether the IP-FAX transmission should be limited or not in accordance with the determination result of whether the country information on the telephone number of the transmitting destination matches the country information on the domain of the transmitting-destination information. When it is set that the specific domain (".com" domain in FIG. 4) does not become a target of the determination of whether the country information on the telephone number of the transmitting destination matches the country information on the domain of the transmitting-destination information, the specific domain does not become a target of the determination.

When it is determined that the IP-FAX transmission is not limited to the transmitting destination in the step S525, the CPU 130 starts a media session with the machine (the third MFP 110) of the transmitting destination (step S526). Then, the CPU 130 waits for an end (the transmission end of the image data) of the media session (step S527).

After the media session is finished, the CPU 130 transmits "Bye" and performs a receiving process for a transmission result (step S528). Next, the CPU 130 records the information including the transmission destination, a transmission start time, a sender information, etc., into the transmission log, and prints and outputs the transmission result report that mentions the information recorded in the transmission log and the image on the first page of the transmission image (step S529). And the CPU 130 finishes this process.

When it is determined that the transmission limit due to the inconsistency of the country information is not set in the step S524, the CPU 130 starts the media session with the machine of the transmitting destination (step S526).

When it is determined that the domain of the transmitting-destination information corresponds to the transmission limit domains in the step S522, the CPU 130 displays a message indicating the transmission limit onto the operation unit 133 (step S523). Then, the CPU 130 transmits "Bye" and performs a receiving process for a transmission result (step S528). Next, the CPU 130 records the transmission log, and outputs the transmission result report (step S529). In this case, the CPU 130 records the information representing a transmission error due to the transmission limit and the transmitting-destination information (the network address) into the transmission log, and prints and outputs the transmission result report that mentions the information recorded in the transmission log. And the CPU 130 finishes this process.

When it is determined that the IP-FAX transmission to the transmitting destination is limited in the step S525, the CPU 130 displays of the message indicating the transmission limit (step S523), and transmits "Bye" (step S528). Then, the CPU 130 records the transmission log, and outputs the transmission result report (step S529). And the CPU 130 finishes this process.

When it is determined that the limit of the IP-FAX transmission is set in the step S515, the CPU 130 displays the message indicating the transmission limit (step S512), records the transmission log, and outputs the transmission result report (step S513). And the CPU 130 finishes this process.

When it is determined that the domain of the transmitting destination does not correspond to the transmission limit domains in the step S517, the CPU 130 similarly displays the message indicating the transmission limit (step S512), records the transmission log, and outputs the transmission result report (step S513). And the CPU 130 finishes this process.

Thus, since the transmission limit domains are set in the present embodiment, the IP-FAX transmission can be controlled in detail.

The first MFP 100 acquires the information (sip: info@abc.com.cn) about the third MFP 110 mentioned in the "200 OK" that is transmitted from the third MFP 110 via the SIP server 104 in the examples shown in FIG. 5 and FIG. 6. However, it should be noted that another procedure may be employed. That is, the SIP server 104 rather than the third MFP 110 may notify the first MFP 100 of the information (sip:info@abc.com.cn) about the third MFP 110 that is an actual communication destination.

Next, a second embodiment of the present invention will be described. The second embodiment has the same configuration as the first embodiment, and the second embodiment will be described using the same reference signs as the first embodiment.

Figure 9:
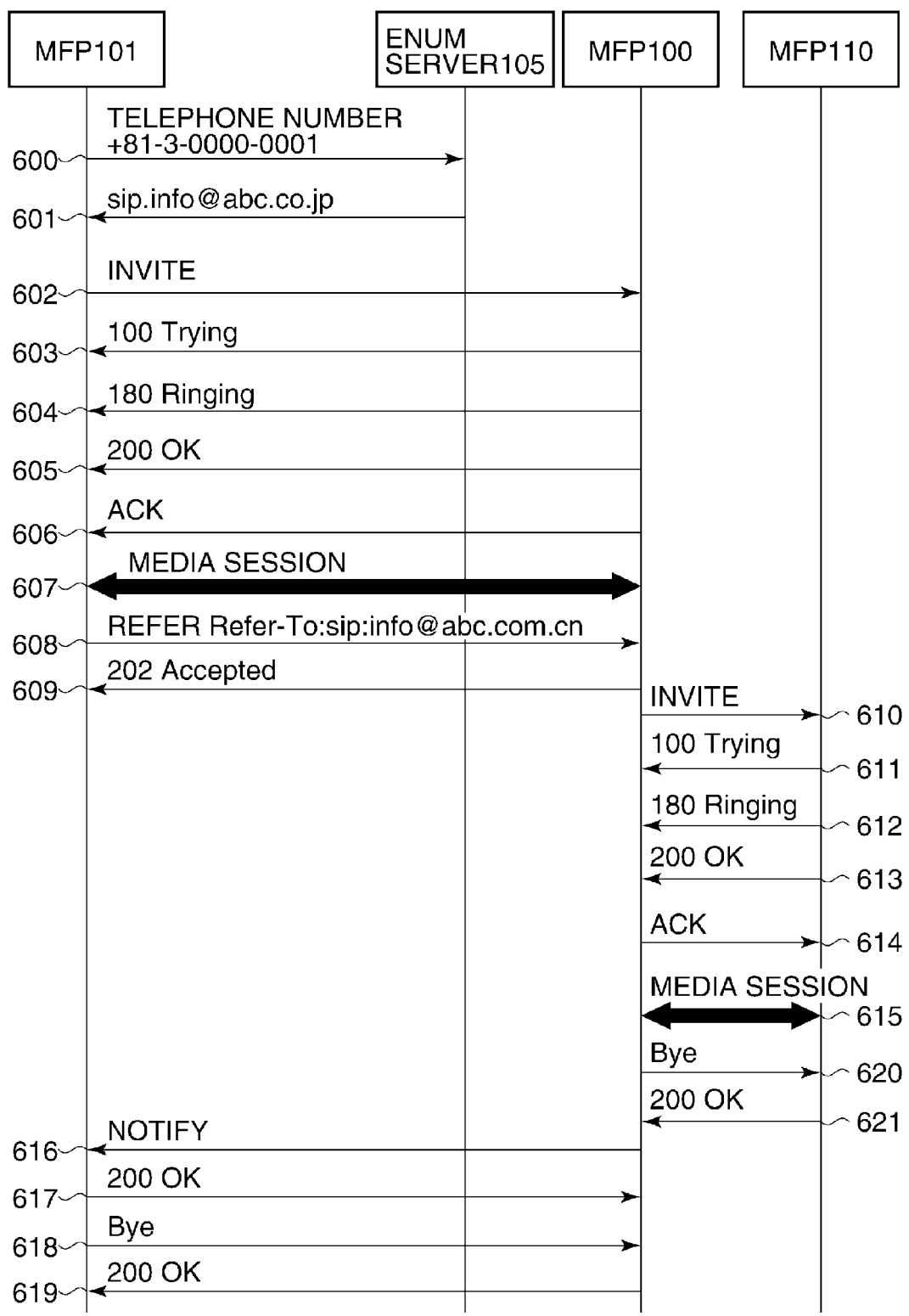
FIG. 9 is a view showing a sequence when the first MFP transmits data received from the second MFP to the third MFP by an IP-FAX communication according to a transmission request from the second MFP in a second embodiment of the present invention.

First, a sequence when the first MFP 100 transmits data received from the second MFP 101 to the third MFP 110 according to a transmission request from the second MFP 101 will be described with reference to FIG. 9. FIG. 9 is a view showing a sequence when the first MFP 100 transmits data received from the second MFP 101 to the third MFP 110 by an IP-FAX communication according to the transmission request from the second MFP 101 as a transmitting source in the second embodiment of the present invention. In FIG. 9, the SIP server 104 arranged between the first MFP 100 and the third MFP 110 is not shown.

When the second MFP 101 transmits image data to the first MFP 100 by the IP-FAX transmission, as shown in FIG. 9, the second MFP 101 inquires a destination of the telephone number "+81-3-0000-0001" to the ENUM server 105 (600). The ENUM server 105 returns "sip:info@abc.co.jp" as the destination of the telephone number in response to the query (601).

Next, the second MFP 101 issues "INVITE" to the first MFP 100 (602). The first MFP 100 returns "200 OK" to the second MFP 101 following provisional messages of "100 Trying" and "180 Ringing" (603 through 605). Detecting that the first MFP 100 is ready to receive data, the second MFP 101 transmits "ACK" to the first MFP 100 (606). Here, the messages from the "INVITE" to the "ACK" are the SIP messages.

After transmitting the "ACK", the second MFP 101 starts a media session with the first MFP 100, and transmits image data to the first MFP 100 by communication defined by the T.38 (607).

After finishing the media session (after finishing the transmission of the image data), the second MFP 101 transmits "REFER" to the first MFP 100 (608). This is a message to request the first MFP 100 to transmit the received data to the third MFP 110 having "sip:info@abc.com.cn". Receiving the request, the first MFP 100 determines whether the transmission of the received data to the third MFP 110 will be permitted or limited. When it is determined that the above-mentioned transmission will be permitted, the first MFP 100 transmits "202 Accepted" (approval) to the second MFP 101 (609). The first MFP 100 transmits "INVITE" to the third MFP 110 that is the transmitting destination of the data (610).

Receiving the "INVITE", the third MFP 110 returns "200 OK" to the first MFP 100 following provisional messages of "100 Trying" and "180 Ringing" (611 through 613). Receiving the "200 OK", the first MFP 100 detects that the third MFP 110 is ready to receive data, and transmits "ACK" (614). The first MFP 100 starts a media session with the third MFP 110, and transmits the image data to the third MFP 110 by the communication defined by the T.38 (615).

After finishing the media session, the first MFP 100 transmits "Bye" to the third MFP 110 (620). The third MFP 110 returns "200 OK" to the first MFP 100 in response to the "Bye" (621). Accordingly, the call between the first MFP 100 and the third MFP 110 is terminated.

The first MFP 100 transmits "NOTIFY" to the second MFP 101 in order to inform that the data transmission is finished (616). The second MFP 101 transmits "Bye" to the first MFP 100 (618) following "200 OK" (617). The first MFP 100 transmits "200 OK" to the second MFP 101 (619) in response to the "Bye". Accordingly, the call between the first MFP 100 and the second MFP 101 is terminated.

Figure 10:
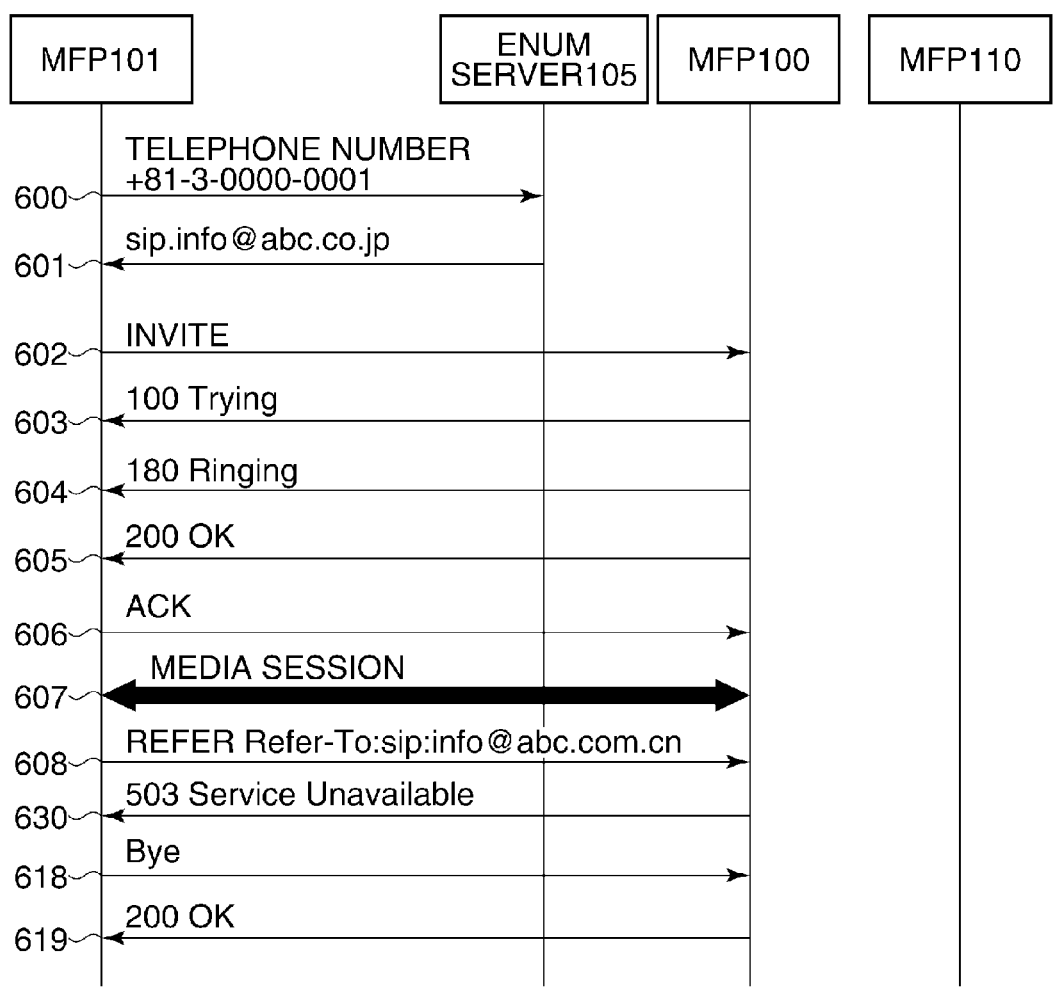
FIG. 10 is a view showing a sequence when the first MFP transmits data received from the second MFP to the third MFP according to a transmission request from the second MFP under the condition where a data transmission by the first MFP is not permitted in the second embodiment of the present invention.

Next, a sequence when the first MFP 100 transmits data received from the second MFP 101 to the third MFP 110 according to a transmission request from the second MFP 101 under the condition where the data transmission by the first MFP 100 is not permitted will be described with reference to FIG. 10. FIG. 10 is a view showing the sequence when the first MFP 100 transmits data received from the second MFP 101 to the third MFP 110 according to a transmission request from the second MFP 101 under the condition where the data transmission by the first MFP 100 is not permitted in the second embodiment of the present invention.

As shown in FIG. 10, the sequence until the second MFP 101 transmits image data to the first MFP 100 (607) by the communication defined by the T.38 is the same as the sequence shown in FIG. 9.

After finishing the media session (after finishing the transmission of the image data), the second MFP 101 transmits "REFER" to the first MFP 100, and requests the first MFP 100 to transmit the received data to the third MFP 110 ("sip:info@abc.com.cn") (608).

Receiving the request, the first MFP 100 determines whether the domain of the IP address "sip:info@abc.cn" given to the third MFP 110 that is the destination of the received data corresponds to the transmission limit domains set on the facsimile transmission limit setting screen (FIG. 4). In this case, it is assumed that the domain of the IP address "sip:info@abc.com.cn" of the third MFP 110 corresponds to the transmission limit domains. In this case, the first MFP 100 returns "503 Service Unavailable" to the second MFP 101 (630), and does not transmit the received data.

Receiving the "503 Service Unavailable", the second MFP 101 detects that the first MFP 100 does not transmit the data to the third MFP 110, and transmits "Bye" to the first MFP 100 (618). Receiving the "Bye", the first MFP 100 returns "200 OK" to the second MFP 101, and finishes the process.

Figure 11:
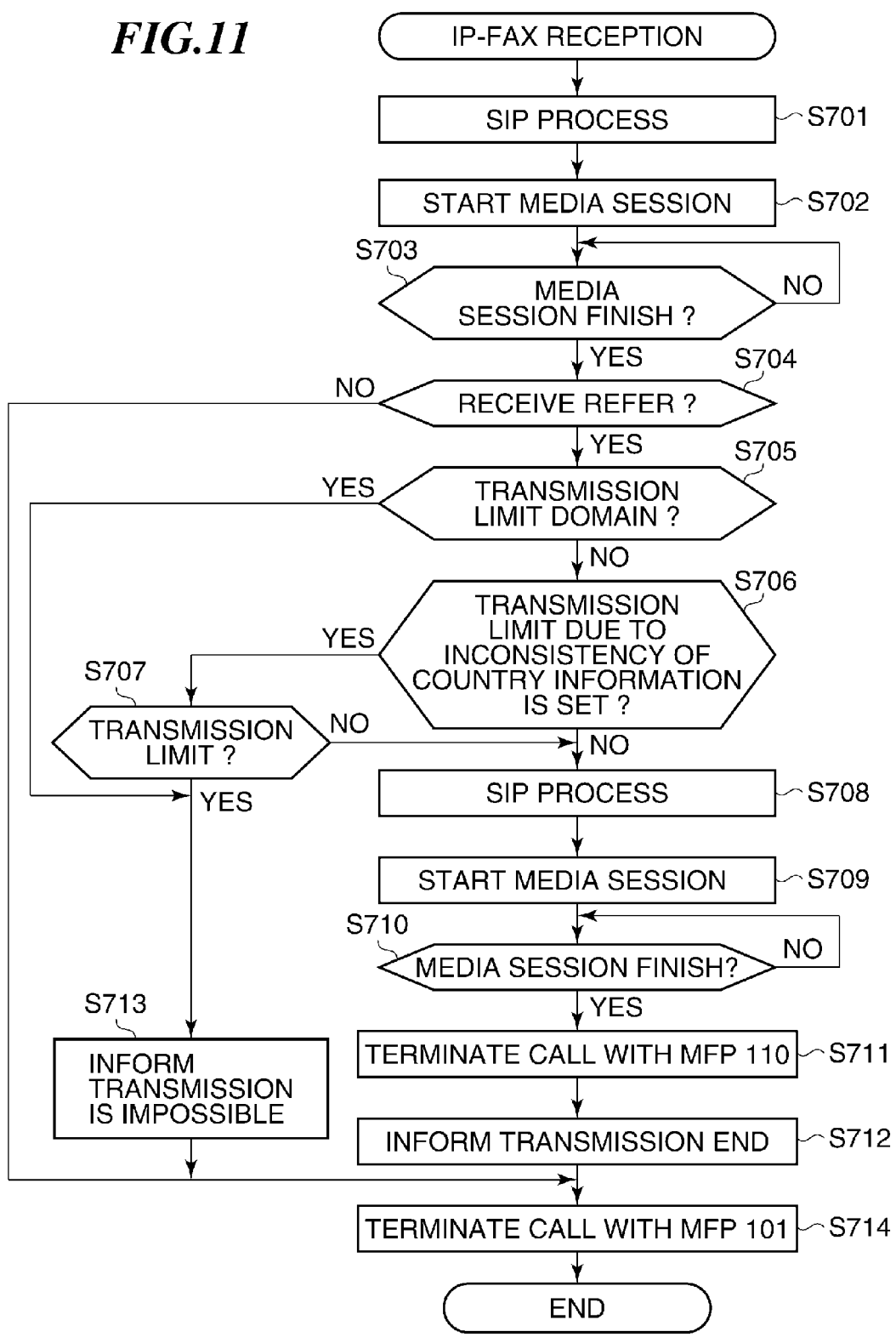
FIG. 11 is a flowchart showing operation procedures of the first MFP when the first MFP transmits data received from the second MFP to the third MFP in the second embodiment of the present invention.

Next, an operation when the first MFP 100 transmits data received from the second MFP 101 to the third MFP 110 will be described with reference to FIG. 11. FIG. 11 is a flowchart showing operation procedures of the first MFP 100 when the first MFP 100 transmits data received from the second MFP 101 to the third MFP 110 in the second embodiment of the present invention. The procedures of the flowchart shown in FIG. 11 are executed by the CPU 130 according to the program stored in the ROM 131.

When the first MFP 100 receives image data transmitted from the second MFP 101, as shown in FIG. 11, the CPU 130 exchanges SIP messages (602 through 606 in FIG. 9 or FIG. 10) by the SIP process (step S701).

Next, the CPU 130 starts a media session and receives the image data by the communication defined by the T.38 (step S702). The received image data is stored into the hard disk 137. Then, the CPU 130 waits for an end of the media session (an end of reception of the image data transmitted from the second MFP 101) (step S703).

After the media session is finished, the CPU 130 receives a message transmitted from the second MFP 101, and determines whether the message concerned is "REFER" (step S704). When the received message is not the "REFER", the CPU 130 terminates the call with the second MFP 101 (step S714), and finishes this process. In this case, receiving the "Bye" transmitted from the second MFP 101, the CPU 130 returns "200 OK" to the second MFP 101 in response to the "Bye".

When it is determined that the received message is the "REFER" in the step S704, the CPU 130 acquires the transmitting-destination information on the transmitting destination (transferring destination) of the received image data that is included in the "REFER." The CPU 130 determines whether the domain of the transmitting-destination information acquired corresponds to the transmission limit domains that have been set (step S705). When it is determined that the domain of the transmitting-destination information corresponds to the transmission limit domains, the CPU 130 transmits "503 Service Unavailable" to the second MFP 101 in order to inform that a transmission is impossible (step S713). The CPU 130 terminates the call with the second MFP 101 (step S714), and finishes this process.

When it is determined that the domain of the transmitting destination does not correspond to the transmission limit domains in the step S705, the CPU 130 determines whether the transmission limit when country information on a telephone number of the transmitting destination does not match country information on the domain is set (step S706).

When it is determined that the transmission limit due to the inconsistency of the country information is set in the step S706, the CPU 130 determines whether the IP-FAX transmission to the transmitting destination should be limited or not (step S707). In this case, it is determined whether the IP-FAX transmission should be limited or not in accordance with the determination result of whether the country information on the telephone number of the transmitting destination matches the country information on the domain. If it is set that the specific domain (".com" domain in FIG. 4) does not become a target of the determination, the specific domain does not become the target of the determination.

When it is determined that the IP-FAX transmission is not limited to the transmitting destination in the step S707, the CPU 130 exchange the SIP messages with the third MFP 110 by the SIP process (step S708). Accordingly, the first MFP 100 is connected to the third MFP 110 while enabling the IP-FAX transmission. The CPU 130 transmits "202 Accepted" to the second MFP 101 in order to inform the second MFP 101 to transmit the received data to the requested destination.

Subsequently, the CPU 130 starts the media session to transmit the received image data (step S709). Then, the CPU 130 waits for an end (the transmission end of the image data) of the media session (step S710). After the media session is finished, the CPU 130 terminates the call with the second MFP 101 (step S711). In this case, the first MFP 100 transmits "Bye" to the third MFP 110, and the third MFP 110 returns "200 OK" to the first MFP 100.

Subsequently, the CPU 130 transmits "NOTIFY" to the second MFP 101 in order to inform the second MFP 101 of the end of the transmission (step S712). And the CPU 130 terminates the call with the second MFP 101 (step S714), and finishes this process.

When it is determined that the IP-FAX transmission is limited to the transmitting destination in the step S707, the CPU 130 informs the second MFP 101 that the transmission is impossible (step S713). And the CPU 130 terminates the call with the second MFP 101 (step S714), and finishes this process.

Thus, since the transmission limit domains are set in the present embodiment, the IP-FAX transmission can be controlled in detail.

In the above mentioned first and second embodiments, no transmission process is executed (i.e., the transmission is prohibited) when the transmission is limited. However, it should be noted that another procedure may be employed. That is, when limiting a transmission, it is possible that an MFP displays a message for checking a transmission by a user and permits the transmitting process only when the user's approval is obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

| Reference Signs List | |
| --- | --- |
| 100, 101, 110 | MFP |
| 102 | LAN |
| 103 | Internet Network |
| 104 | SIP Server |
| 105 | ENUM Server |
| 130 | CPU |
| 131 | ROM |
| 133 | Operation Unit |
| 137 | Hard Disk |
| 138 | Network I/F |

The invention claimed is:

1. A transmission apparatus comprising:
an input unit configured to input a telephone number of a transmitting destination of image data;
an acquiring unit configured to acquire a network address corresponding to the telephone number inputted via said input unit;
a transmission unit configured to transmit the image data using the network address acquired by said acquiring unit;
a determination unit configured to determine whether or not a country indicated by country information included in the telephone number inputted by said input unit matches a country indicated by country information included in the network address acquired by said acquiring unit; and
a control unit configured to prevent transmission of the image data by said transmission unit when it is determined that the country indicated by the country information included in the telephone number inputted by said input unit does not match the country indicated by the country information included in the network address acquired by said acquiring unit.

2. The transmission apparatus according to claim 1, wherein said acquisition unit is configured to request that a telephone number converting apparatus convert the telephone number inputted via said input unit into the network address, the network address being a network address of the transmitting destination.

3. The transmission apparatus according to claim 1, wherein said transmission unit is configured to transmit the image data according to Session Initiation Protocol (SIP).

4. The transmission apparatus according to claim 1, wherein said determination unit is configured to perform the determination based on a domain of the network address acquired by said acquisition unit.

5. The transmission apparatus according to claim 1, wherein said determination unit is configured to perform the determination without a specified domain as a target of the determination.

6. A control method of a transmission apparatus, comprising:
- an input step of inputting a telephone number of a transmitting destination of image data;
- an acquiring step of acquiring a network address corresponding to the inputted telephone number;
- a transmission step of transmitting the image data using the acquired network address;
- a determination step of determining whether or not a country indicated by country information included in the inputted telephone number matches a country indicated by country information included in the acquired network address; and
- a control step of preventing transmission of the image data when it is determined that the country indicated by the country information included in the inputted telephone number does not match the country indicated by the country information included in the acquired network address.

7. A non-transitory computer-readable storage medium storing a computer-executable program configured to be executed at least by a computer of a transmission apparatus, the program comprising:
- input instructions configured to input a telephone number of a transmitting destination of image data;
- acquiring instructions configured to acquire a network address corresponding to the telephone number inputted according to said input instructions;
- transmission instructions configured to transmit the image data using the network address acquired according to said acquiring instructions;
- determination instructions configured to determine whether or not a country indicated by country information included in the telephone number inputted according to said input instructions matches a country indicated by country information included in the network address acquired according to said acquiring instructions; and
- control instructions configured to prevent transmission of the image data according to said transmission instructions when it is determined that the country indicated by the country information included in the telephone number inputted according to said input instructions does not match the country indicated by the country information included in the network address acquired according to said acquiring instructions.

8. A transmission apparatus comprising:

at least one processing device; and at least one non-transitory storage medium connected to and accessible by the at least one processing device, the at least one non-transitory storage medium storing a program configured to be executed at least by the at least one processing device, wherein the at least one processing device is configured by the program at least to cause:

inputting of a telephone number of a transmitting destination of image data;

acquisition of a network address corresponding to the inputted telephone number;

transmission of the image data using the acquired network address;

determination of whether or not a country indicated by country information included in the inputted telephone number matches a country indicated by country information included in the acquired network address; and prevention of transmission of the image data when it is determined that the country indicated by the country information included in the inputted telephone number does not match the country indicated by the country information included in the acquired network address.

* * * * *